United States Patent
Poget et al.

(10) Patent No.: US 9,717,273 B2
(45) Date of Patent: *Aug. 1, 2017

(54) METHOD OF MANUFACTURING A COMBUSTIBLE HEAT SOURCE

(71) Applicant: Philip Morris Products S.A., Neuchatel (CH)

(72) Inventors: Laurent Edouard Poget, Bussigny (CH); Oleg Mironov, Neuchatel (CH); Guenter Rinn, Lahnau (DE); Hans Lippert, Lauterbach (DE)

(73) Assignee: Philip Morris Products S.A., Neuchatel (CH)

( * ) Notice: Subject to any disclaimer, the term of this patent is extended or adjusted under 35 U.S.C. 154(b) by 56 days.

This patent is subject to a terminal disclaimer.

(21) Appl. No.: 14/390,177

(22) PCT Filed: Mar. 15, 2013

(86) PCT No.: PCT/EP2013/055459
§ 371 (c)(1),
(2) Date: Oct. 2, 2014

(87) PCT Pub. No.: WO2013/149810
PCT Pub. Date: Oct. 10, 2013

(65) Prior Publication Data
US 2015/0107759 A1    Apr. 23, 2015

(30) Foreign Application Priority Data
Apr. 2, 2012    (EP) .................................. 12162880

(51) Int. Cl.
*A24F 47/00*    (2006.01)
*B29C 69/00*    (2006.01)
*A24B 15/16*    (2006.01)

(52) U.S. Cl.
CPC .......... *A24F 47/004* (2013.01); *A24B 15/165* (2013.01); *B29C 69/005* (2013.01); *Y10T 156/107* (2015.01)

(58) Field of Classification Search
CPC . Y10T 156/107; B29C 69/005; A24F 47/004; A24B 15/165
(Continued)

(56) References Cited

U.S. PATENT DOCUMENTS 4,786,342 A * 11/1988 Zellner .................... B28B 3/02
156/231
4,819,665 A    4/1989 Roberts et al.
(Continued)

FOREIGN PATENT DOCUMENTS

CN    85 1 06876 A    9/1986
CN    1077360 A    10/1993
(Continued)

OTHER PUBLICATIONS

Office Action issued Mar. 31, 2016 in Korean Patent Application No. 10-2014-7027764 (with English language translation).
(Continued)

*Primary Examiner* — Philip Tucker
*Assistant Examiner* — John Blades
(74) *Attorney, Agent, or Firm* — Oblon, McClelland, Maier & Neustadt, L.L.P.

(57) ABSTRACT

There is provided a method of manufacturing a combustible heat source having a barrier, the method including providing a mold defining a cavity; placing a particulate component in the mold cavity; placing a laminar component, adjacent the mold, to cover the cavity opening; and compressing the particulate component to form the combustible heat source, wherein, during the compression step, the barrier is formed by punching the laminar component using a punch and the (Continued)

Figure 2A:
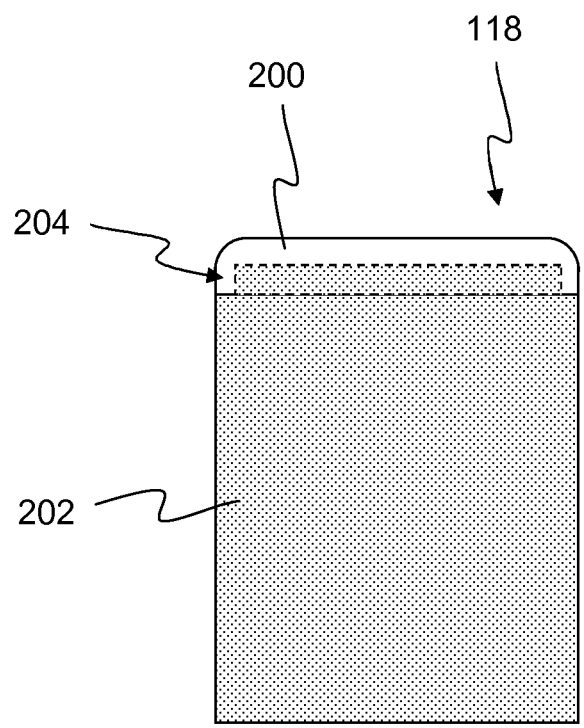

mold, the punch acting on the barrier to compress the particulate component and affix the barrier to the combustible heat source.

15 Claims, 2 Drawing Sheets

(58) Field of Classification Search
USPC .......................................................... 156/261
See application file for complete search history.

(56) References Cited

U.S. PATENT DOCUMENTS

| | | | |
|---|---|---|---|
| 5,027,836 | A | 7/1991 | Shannon et al. |
| 5,129,409 | A | 7/1992 | White et al. |
| 5,345,955 | A | 9/1994 | Clearman et al. |
| 2009/0065011 | A1 | 3/2009 | Maeder et al. |

FOREIGN PATENT DOCUMENTS

| | | | |
|---|---|---|---|
| CN | 1087497 | A | 6/1994 |
| CN | 1190335 | A | 8/1998 |
| CN | 1529683 | A | 9/2004 |
| CN | 1575135 | A | 2/2005 |
| CN | 101048083 | A | 10/2007 |
| CN | 101778578 | A | 7/2010 |
| CN | 102159100 | A | 8/2011 |
| EP | 0 174 645 | A2 | 3/1986 |
| EP | 0 277 519 | A2 | 8/1988 |
| EP | 0 405 190 | A2 | 1/1991 |
| EP | 0 588 247 | A2 | 3/1994 |
| EP | 2 113 177 | A1 | 11/2009 |
| KR | 10-2006-0107546 | A | 10/2006 |
| KR | 10-2007-0054249 | A | 5/2007 |
| TW | 201204486 | A1 | 2/2012 |
| WO | WO 2006/004934 | A | 1/2006 |
| WO | WO 2009/022232 | A2 | 2/2009 |

OTHER PUBLICATIONS

International Search Report issued Sep. 5, 2013, in PCT/EP2013/055459, filed Mar. 15, 2013.
Office Action issued Dec. 7, 2015 in Japanese Patent Application No. 2015-503806 (with English language translation).
Combined Chinese Office Action and Search Report issued Oct. 28, 2015 in Patent Application No. 201380026301.5 (with English language translation).
Chinese Office Action and Search Report dated Jun. 3, 2016 in Patent Application No. 201380038772.8 (with English language translation).
International Search Report and Written Opinion of the International Searching Authority dated Nov. 22, 2013, in PCT/EP2013/062290, filed Jun. 13, 2013.
Office Action dated Oct. 5, 2016 in Taiwanese Patent application No. 102111314 (submitting English translation only).

\* cited by examiner

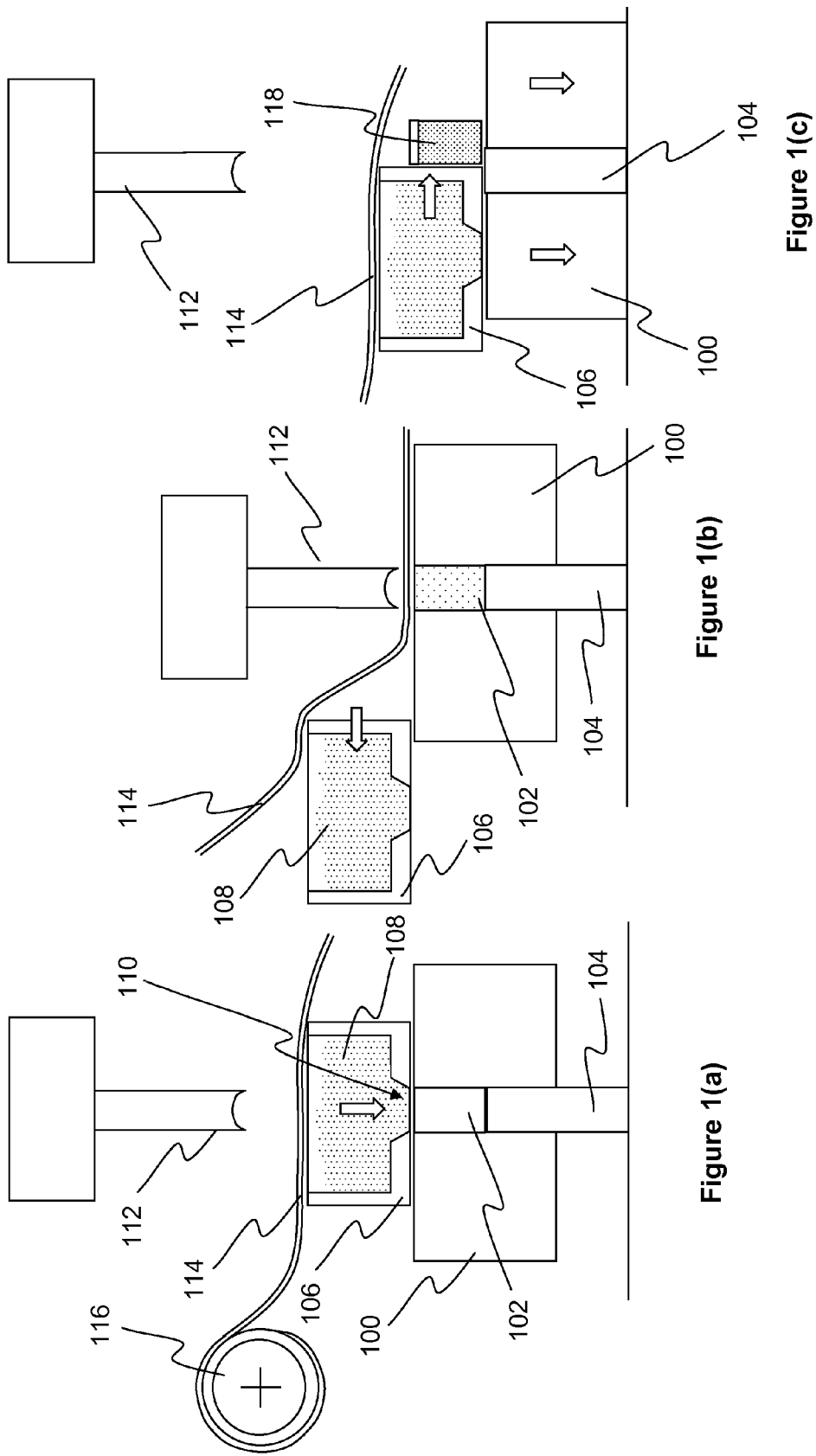

METHOD OF MANUFACTURING A COMBUSTIBLE HEAT SOURCE

CROSS REFERENCE TO RELATED APPLICATION

This application is a national phase application based on PCT/EP2013/055459, filed on Mar. 15, 2013.

The present invention relates to a method of manufacturing a combustible heat source having a barrier.

A number of smoking articles in which tobacco is heated rather than combusted have been proposed in the art. One aim of such 'heated' smoking articles is to reduce known harmful smoke constituents of the type produced by the combustion and pyrolytic degradation of tobacco in conventional cigarettes. In one known type of heated smoking article, an aerosol is generated by the transfer of heat from a combustible heat source to an aerosol-forming substrate located downstream of the combustible carbonaceous heat source. During smoking, volatile compounds are released from the aerosol-forming substrate by heat transfer from the combustible heat source and entrained in air drawn through the smoking article. As the released compounds cool, they condense to form an aerosol that is inhaled by the user.

For example, WO-A2-2009/022232 discloses a smoking article comprising a combustible heat source, an aerosol-forming substrate downstream of the combustible heat source, and a heat-conducting element around and in direct contact with a rear portion of the combustible heat source and an adjacent front portion of the aerosol-forming substrate.

Combustible heat sources for use in such smoking articles are known to be manufactured in multi-stage process in which the heat source is formed by pressing particulate material to form a solid heat source. The particulate material is known to be carbon-based and non-carbon-based, and may also comprise a binder to improve the structural properties of the heat source. The heat conducting element is then attached to the heat source in a subsequent process.

As such, it is an object of the present invention to provide a method of manufacture that increases the efficiency of manufacturing combustible heat sources.

According to one aspect of the present invention, there is provided a method of manufacturing a combustible heat source having a barrier, which is used as a separation between the heat source and an aerosol forming substrate. The method comprises providing a mould defining a cavity; placing a particulate component in the mould cavity; placing a laminar component, adjacent the mould, to cover the cavity opening; compressing the particulate component to form the combustible heat source; wherein, during the compression step, the barrier is formed by punching the laminar component using a punch and the mould, the punch acting on the barrier to compress the particulate component and affix the barrier to the combustible heat source.

Providing such a method advantageously, reduces the number of steps involved in manufacturing combustible heat sources having a barrier. Therefore, heat sources may be manufactured more cheaply, and more quickly. In addition, providing a method in which the particulate component of the heat source is not in direct contact with the compressing equipment due to the barrier component advantageously reduces the potential of particulate components from adhering to the punch. This may be particularly advantageous where the particulate material comprises a binder as described below.

The "barrier" is also known as a "back-coating", and as such the invention is a method of manufacturing a heat source having a back-coating in a single stage process.

As used herein, the term 'particulate component' is used to describe any flowable particulate material or combination of particulate materials including, but not limited to, powders and granules. Particulate component used in methods according to the invention may comprise two or more particulate materials of different types. Alternatively or in addition, particulate components used in methods according to the invention may comprise two or more particulate materials of different composition.

In use, the barrier may advantageously limit the temperature to which the aerosol-forming substrate is exposed during ignition or combustion of the combustible heat source, and so help to avoid or reduce thermal degradation or combustion of the aerosol-forming substrate during use of the smoking article.

In a preferred embodiment, the method further comprises providing an adhesive between the combustible heat source and the barrier. The adhesive improves the adhesion of the barrier to the combustible heat source. The adhesive is preferably applied to the laminar component before being placed adjacent the mould. The adhesive may be applied by a spray gun, a roller, a slot gun or any other suitable method. The adhesive may be any adhesive suitable for permanently affixing the barrier material to the compressed particulate material. The adhesive is preferably able to withstand the high temperatures during ignition or combustion of the combustible heat source. Preferably, the adhesive is PVA (polyvinyl acetate) adhesive. Additionally or alternatively, additives in the heat source, like the binding agent may serve as an adhesive, such as, for example, CMC, or potassium silicate.

In a particularly preferred embodiment, the laminar material is provided with pre-applied adhesive.

Preferably, the particulate component is provided with a binding agent. The binding agent may be configured to bind the combustible heat source to the barrier. In the case where the binding agent is configured to bind the combustible heat source to the barrier an adhesive may not be provided between the combustible heat source and the barrier. In a further embodiment, the particulate component may be provided with one or more such binding agents.

The one or more binding agents may be organic binders, inorganic binders or a combination thereof. Suitable known organic binders, include but are not limited to, gums (for example, guar gum), modified celluloses and cellulose derivatives (for example, methyl cellulose, carboxymethyl cellulose, hydroxypropyl cellulose and hydroxypropyl methylcellulose) flour, starches, sugars, vegetable oils and combinations thereof.

Suitable known inorganic binders include, but are not limited to: clays such as, for example, bentonite and kaolinite; alumino-silicate derivatives such, for example, as cement, alkali activated alumino-silicates; alkali silicates such as, for example, sodium silicates and potassium silicates; limestone derivatives such as, for example, lime and hydrated lime; alkaline earth compounds and derivatives such as, for example, magnesia cement, magnesium sulfate, calcium sulfate, calcium phosphate and dicalcium phosphate; and aluminium compounds and derivatives such as, for example, aluminium sulphate.

Preferably, the barrier at least partially extends along a side of the combustible heat source to form a cap. The cap preferably extends along a longitudinal side of the combustible heat source. The cap preferably extends along the longitudinal side of the combustible heat source for a distance of less than about 500 microns. In certain preferred embodiments, the cap extends along the longitudinal side of the combustible heat source for a distance of less than about 5 times the thickness of the barrier, more preferably less than about 3 times the thickness of the barrier. Advantageously, providing a barrier in such an arrangement increases the structural rigidity of the corners of the combustible heat source covered by the cap.

Preferably, the punch profile that contacts the barrier is concave. The use of the concave profile helps to form rounded or truncated edges on the periphery of the heat source extremity. Providing a concave punch profile also enables the barrier to form a convex-like cap on the combustible heat source. Preferably, the concave profile has a depth of between about 0.25 mm and about 1 mm, more preferably the concave profile has a depth of between about 0.4 mm and about 0.6 mm. The angle of the chamfered edge of the concave profile is preferably between about 30 degrees and about 80 degrees. The punch and mould preferably have corresponding circular cross-sections. Alternatively, the punch and mould may have corresponding elliptical cross-sections.

Advantageously, providing a punch with a concave profile reduces the risk of deformation or an airlock between the heat source and the barrier.

Preferably, the barrier of the present invention is non-combustible. As used herein, the term 'non-combustible' is used to describe a barrier that is substantially non-combustible at temperatures reached by the combustible heat source during combustion or ignition thereof.

Preferably, the barrier is substantially air-impermeable. As used herein, the term 'air-impermeable' is used to describe a barrier that substantially prevents air from being drawn through the barrier when the combustible heat source having the barrier is in use in a smoking article, as described in further detail below. Advantageously, providing a substantially air-impermeable barrier may reduce the level of combustion products being drawn through the smoking article.

Depending upon the desired characteristics and performance of the smoking article, the barrier may have a low thermal conductivity or a high thermal conductivity. In certain embodiments, the barrier may be formed from material having a bulk thermal conductivity of between about 0.1 Watts per meter Kelvin (W/(m·K)) and about 200 Watts per meter Kelvin (W/(m·K)), at 23° C. and a relative humidity of 50% as measured using the modified transient plane source (MTPS) method. Preferably, the thermal conductivity of the barrier is at least about 200 Watts per meter Kelvin (W/(m·K)).

The thickness of the barrier may be appropriately adjusted to achieve good smoking performance when the combustible heat source is provided in a smoking article as described above. In certain embodiments, the barrier may have a thickness of between about 10 microns and about 500 microns. Preferably, the thickness of the barrier is between about 10 microns and about 50 microns, more preferably about 30 microns.

The barrier may be formed from one or more suitable materials that are substantially thermally stable and non-combustible at temperatures achieved by the combustible heat source during ignition and combustion. The barrier is preferably formed from a material that is suitable for being cut using a punch and die. Preferred materials from which the barrier may be formed include copper, aluminium, stainless steel, and alloys. Most preferably, the barrier is formed from aluminium. In a particularly preferred embodiment, the aluminium is >99% pure Aluminium EN AW 1200, or EN AW 8079 alloy.

Preferably, the barrier extends along the entire back surface of the combustible heat source.

The thickness of the barrier may be measured using a microscope, a scanning electron microscope (SEM) or any other suitable measurement methods known in the art.

The method preferably comprises placing the particulate component in the mould cavity using a hopper. The hopper preferably slidably advances over the mould cavity to provide the particulate material, and then slidably retreats from the mould cavity. In one embodiment, an external face of the hopper is utilised to remove a previous combustible heat source having a barrier from the work area when slidably advancing over the mould cavity. The outlet of the hopper may be substantially sealed against the mould until the hopper outlet is adjacent the mould cavity.

As used herein, the term "sealed" indicates that the particulate matter provided in the hopper is prevented from exiting the hopper.

The method preferably comprises placing the laminar component to cover the cavity opening by providing a continuous laminar material. Preferably, the continuous laminar material has a width of between about 1.5 times and 3 times the width of the mould cavity. The continuous laminar material is preferably provided in a direction substantially parallel to the direction that the hopper slides. In this embodiment, the laminar material is provided from over the top of the hopper. In an alternative embodiment, the laminar material is provided in a direction substantially perpendicular to the direction that the hopper slides.

Preferably, the method further comprises restraining the laminar material adjacent the mould cavity during the step of punching the laminar component. Advantageously, restraining the laminar component during the punching operation improves the quality of the barrier. Preferably, the step of restraining the laminar material comprises using a plate, comprising a through hole for receiving the punch, to press the laminar material on to the mould adjacent the cavity.

Preferably, the method further comprises ejecting the formed combustible heat source having a barrier from the cavity. The formed heat source is preferably ejected by moving the portion of the mould forming the base of the cavity relatively towards the cavity opening. In one embodiment, the portion of the mould defining the cavity walls moves downwards, and the portion of the mould defining the base of the cavity remains stationary relative to the portion defining the cavity walls. Preferably, the ejection of the heat source from the mould cavity corresponds to the hopper slidably advancing across the mould, such that an external face of the hopper removes the heat source from the work area.

The mould may define a plurality of cavities, such that a plurality of cavities can be manufactured simultaneously. The plurality of cavities may be provided in a single row, or in multiple rows or staggered rows. In this embodiment, a plurality of punches are provided, each punch corresponding to a cavity.

In an alternative embodiment, the method comprises utilising a continuously rotating multi-cavity press, a so-called turret press. In this embodiment, the cavities rotate about a central axis. The particulate component is provided in the cavity from a hopper, the hopper being stationary relative to the cavity receiving the particulate component. As such, the hopper reciprocates along a line defined by an arc. The laminar material is then provided, adjacent the cavity, to cover the cavity opening, the laminar material being fed substantially tangentially to the rotating multi-cavity press. The punch is provided vertically above the laminar material, and during the step of punching the material, the punch is stationary relative to the cavity being punched. As such, the punch reciprocates both vertically, and along a line defined by an arc. The formed combustible heat source having a barrier is then ejected from the mould.

As described further below, the combustible heat source may be blind or non-blind.

As used herein, the term 'blind' is used to describe a combustible heat source in which air, drawn through a smoking article comprising the heat source, for inhalation by a user does not pass through any airflow channels along the combustible heat source.

As used herein, the term 'non-blind' is used to describe a combustible heat source in which air, drawn through a smoking article comprising the heat source, for inhalation by a user passes through one or more airflow channels along the combustible heat source.

In some embodiments, the combustible heat source may comprise a plurality of layers. In this embodiment, the layers are preferably formed from different particulate material such that distinct layers are formed having distinct properties. The plurality of layers may be formed by placing a first particulate material in the mould cavity, and placing a second particulate material in the mould cavity. The first particulate material corresponds to the first layer and the second particulate material corresponds to the second layer.

As used herein, the terms 'layer' and 'layers' are used to refer to distinct portions of multilayer articles made by methods according to the invention that meet one another along interfaces. Use of the terms 'layer' and 'layers' is not limited to distinct portions of multilayer articles made by methods according to the invention having any particular absolute or relative dimensions. In particular, layers of multilayer articles made by methods according to the invention may be laminar or non-laminar.

Preferably, the particulate component comprises a combustible carbonaceous material. Carbonaceous particulate components for use in methods according to the invention for making combustible carbonaceous heat sources may be formed from one or more suitable carbon-containing materials.

As used herein, the term 'carbonaceous' is used to describe heat sources and particulate components comprising carbon.

In embodiments where the particulate component is carbonaceous, the first particulate component preferably has a carbon content of at least about 35 percent, more preferably of at least about 45 percent, most preferably of at least about 55 percent by dry weight of the first particulate component. In certain preferred embodiments, the first particulate component preferably has a carbon content of at least about 65 percent by dry weight of the first particulate component.

Instead of, or in addition to one or more binders, carbonaceous particulate components for use in methods according to the invention for making combustible carbonaceous heat sources may comprise one or more additives in order to improve the properties of the combustible carbonaceous heat source. Suitable additives include, but are not limited to, additives to promote consolidation of the combustible carbonaceous heat source (for example, sintering aids), additives to promote ignition of the combustible carbonaceous heat source (for example, oxidisers such as perchlorates, chlorates, nitrates, peroxides, permanganates, zirconium and combinations thereof), additives to promote combustion of the combustible carbonaceous heat source (for example, potassium and potassium salts, such as potassium citrate) and additives to promote decomposition of one or more gases produced by combustion of the combustible carbonaceous heat source (for example catalysts, such as CuO, $Fe_2O_3$ and $Al_2O_3$).

Where methods according to the invention are used to make combustible carbonaceous heat sources for smoking articles, at least one of the particulate components comprises carbon. Preferably, at least one of the particulate components comprises an ignition aid. In certain embodiments, at least one of the particulate components may comprise carbon and an ignition aid.

In embodiments where the first particulate component comprises an ignition aid, the first particulate component preferably has an ignition aid content of less than or equal to about 60 percent, more preferably of less than or equal to about 50 percent, most preferably of less than or equal to about 40 percent by dry weight. In certain preferred embodiments, the first particulate component preferably has an ignition aid content of less than or equal to about 30 percent by dry weight.

As used herein, the term 'ignition aid' is used to denote a material that releases one or both of energy and oxygen during ignition of the combustible heat source, where the rate of release of one or both of energy and oxygen by the material is not ambient oxygen diffusion limited. In other words, the rate of release of one or both of energy and oxygen by the material during ignition of the combustible heat source is largely independent of the rate at which ambient oxygen can reach the material. As used herein, the term 'ignition aid' is also used to denote an elemental metal that releases energy during ignition of the combustible heat source, wherein the ignition temperature of the elemental metal is below about 500° C. and the heat of combustion of the elemental metal is at least about 5 kJ/g.

As used herein, the term 'ignition aid' does not include alkali metal salts of carboxylic acids (such as alkali metal citrate salts, alkali metal acetate salts and alkali metal succinate salts), alkali metal halide salts (such as alkali metal chloride salts), alkali metal carbonate salts or alkali metal phosphate salts, which are believed to modify carbon combustion. Even when present in a large amount relative to the total weight of the combustible heat source, such alkali metal burn salts do not release enough energy during ignition of a combustible heat source to produce an acceptable aerosol during early puffs.

Examples of suitable oxidizing agents include, but are not limited to: nitrates such as, for example, potassium nitrate, calcium nitrate, strontium nitrate, sodium nitrate, barium nitrate, lithium nitrate, aluminium nitrate and iron nitrate; nitrites; other organic and inorganic nitro compounds; chlorates such as, for example, sodium chlorate and potassium chlorate; perchlorates such as, for example, sodium perchlorate; chlorites; bromates such as, for example, sodium bromate and potassium bromate; perbromates; bromites; borates such as, for example, sodium borate and potassium borate; ferrates such as, for example, barium ferrate; ferrites; manganates such as, for example, potassium manganate; permanganates such as, for example, potassium permanganate; organic peroxides such as, for example, benzoyl peroxide and acetone peroxide; inorganic peroxides such as, for example, hydrogen peroxide, strontium peroxide, magnesium peroxide, calcium peroxide, barium peroxide, zinc peroxide and lithium peroxide; superoxides such as, for example, potassium superoxide and sodium superoxide;

iodates; periodates; iodites; sulphates; sulfites; other sulfoxides; phosphates; phospinates; phosphites; and phosphanites.

Preferably, combustible heat sources made by methods according to the invention have an apparent density of between about 0.8 and about 1.1 g/cm$^3$, more preferably about 0.9 g/cm$^3$.

Preferably, combustible heat sources made by methods according to the invention have a length of between about 2 mm and about 20 mm, more preferably of between about 3 mm and about 15 mm, most preferably of between about 9 mm and about 11 mm.

Preferably, combustible heat sources made by methods according to the invention have a diameter of between about 5 mm and about 10 mm, more preferably of between about 7 mm and about 8 mm, most preferably about 7.8 mm in diameter.

Preferably, combustible heat sources made by methods according to the invention are of substantially uniform diameter. However, methods according to the invention may be used to make combustible heat sources that are tapered such that the diameter of a first end of the combustible heat source is greater than the diameter of an opposed second end thereof.

Preferably, combustible heat sources made by methods according to the invention are substantially cylindrical. For example, methods according to the invention may be used to make cylindrical combustible heat sources of substantially circular cross-section or of substantially elliptical cross-section.

As used herein, the term 'length' is used to describe the dimension in the longitudinal direction of smoking articles.

According to a further aspect of the present invention, there is provided a method of manufacturing a combustible heat source having a barrier. The method comprises providing a die defining a cavity; placing a compressed particulate combustible heat source in the die cavity; placing a laminar component, adjacent the die, to cover the cavity opening; and forming a barrier by punching the laminar component using a punch and the die, the punch acting on the barrier to affix the barrier to the combustible heat source.

Advantageously, forming the barrier by punching the laminar material in the same process as applying the barrier to the combustible heat source increases the efficiency of manufacturing combustible heat sources having a barrier.

The combustible heat source having a barrier as described herein may be used in a smoking article. The smoking article may comprise a combustible heat source having a barrier as described above, an aerosol-forming substrate, a transfer section such as an expansion chamber, a filter section and a mouthpiece. The combustible heat source is preferably provided at a first end of the smoking article adjacent the aerosol-forming substrate. The barrier of the combustible heat source is provided between the heat source and the aerosol-forming substrate. The mouthpiece is provided at a second end of the smoking article. The components of the smoking article are wrapped in a wrapper. The wrapper may be provided with an additional barrier in the region adjacent the combustible heat source.

As used herein, the term "aerosol-forming substrate" refers to a substrate capable of releasing upon heating volatile compounds, which can form an aerosol.

Methods according to the invention may advantageously be used to make combustible heat sources having barriers for smoking articles of the type described above. In particular, methods according to the invention may be advantageously used to make combustible carbonaceous heat sources for smoking articles.

As used herein, means plus function features may be expressed alternatively in terms of their corresponding structure.

Any feature relating to one aspect may be applied to other aspects, in any appropriate combination. In particular, method aspects may be applied to apparatus aspects, and vice versa. Furthermore, any, some or all features in one aspect can be applied to any, some or all features in any other aspect, in any appropriate combination.

It should also be appreciated that particular combinations of the various features described and defined in any aspects of the invention can be implemented or supplied or used independently.

The invention will be further described, by way of example only, with reference to the accompanying drawings in which:

FIG. 1 show schematic representations of a combustible heat source having a barrier being manufactured according to the method of the present invention; and FIG. 2 show a side view, and a top view of a combustible heat source having a barrier.

FIGS. 1(a), 1(b) and 1(c) show schematic representations of the manufacture of a combustible heat source having a barrier. In brief, a combustible heat source having a barrier is manufactured using a mould in which particulate material is provided, the particulate material being carbon based and having a binder, such as gum. The barrier is substantially air-impermeable, non-combustible and is configured to transfer heat from the combustible heat source. A suitable material is aluminium. A laminar material is used to provide a barrier, a so-called back-coating, onto the combustible heat source. The barrier is formed by punching the laminar material. Simultaneously, the particulate material is compressed by the punch providing force through the barrier material. An adhesive is provided between the barrier and the heat source to affix the barrier to the heat source. The formed combustible heat source having a barrier has a substantially circular cross-section.

The machinery utilised to manufacture the heat sources is arranged as follows. A mould 100 is provided that defines the side walls of a cavity for forming the combustible heat source. The bottom wall of the cavity is defined by the segment 104. The mould side walls and the bottom wall are movable relative to each other. A hopper 106 is provided that is configured to provide particulate matter 108 into the mould cavity 102 via the hopper outlet 110. The hopper 106 is slidably mounted relative to the mould 100, such that it can reciprocate along a line perpendicular to the longitudinal axis of the cavity 102. A punch 112 is provided vertically above the cavity 102 and is arranged such that the longitudinal axis of the punch and the longitudinal axis of the cavity are aligned. A laminar material 114 is provided from a bobbin 116 comprising the laminar material. The laminar material is provided in a direction substantially parallel to the direction of that the hopper reciprocates.

FIG. 1(a) shows the hopper 106 positioned such that the outlet 110 is located over the cavity opening. In this position, the hopper provides the particulate matter 108, stored within the hopper, into the cavity 102. Sufficient particulate material is provided into the cavity to form a single combustible heat source. The laminar material 114 is moved away from the mould cavity by the hopper 106 during the filling of the mould 102. To ensure the laminar material affixes to the heat source an adhesive is applied to the laminar material before the punch forms the barrier. The adhesive is pre-applied to one side of the laminar material, and as such the laminar material supplied from the bobbin 116 already has adhesive.

FIG. 1(b) shows the hopper retreating from the filling position shown in FIG. 1(a). As the hopper slides away from the mould cavity opening the punch advances towards the cavity, in the direction as shown. To ensure that the laminar material 114 is in the correct position for punching the barrier, it is restrained by a plate (not shown) that is resiliently attached to the punch 112. As the punch advances towards the cavity, the plate engages with the laminar material to restrain it over the opening of the cavity 102. Once engaged, the plate stops moving relative to the mould, and the punch continues to advance, moving relative to the plate and the cavity. The punch forms a barrier from the laminar material by using the cavity opening as a die. The punch applies force to the particulate material via the formed barrier. Therefore, the particulate material is compressed by the punch at the same time as the barrier is formed. In addition to forming the heat source and the barrier, the punch is provided with a concave cross-sectional profile which enables the cutting of the laminar material used for the barrier. In effect, providing a concave punch profile forms a knife-like edge to the punch to enable the laminar material to be cut more easily. The concave profile may also ease the moulding of the cap on the heat source extremity. By providing a concave profile the particulate material is moved away from the interface between the punch and the side walls of the mould. By moving the particulate material away from the interface, the remains clear from particulate material and may reduce the friction between the punch and the mould walls; in effect, the concave punch acts as a scraper along the side walls of the mould. Furthermore, the concave punch profile forms rounded or truncated edges on the periphery of the heat source. Thus a convex shaped barrier is provided as described in further detail below. Once the compressing step is complete, the punch retreats vertically.

FIG. 1(c) shows the punch retreating. As the punch retreats the mould portion defining the walls of the cavity is lowered relative to the portion of the mould forming the bottom of the cavity. In this way, the heat source 118 is ejected from the mould cavity. As the mould portion defining the side walls of the cavity is lowered, the hopper is slidably advanced along the top face of the mould to begin the process of manufacturing a further heat source. As the hopper advances, the leading edge of the hopper is utilised to clear the formed heat source from the work area. In this way, a continuous process is provided.

Figure 2B:
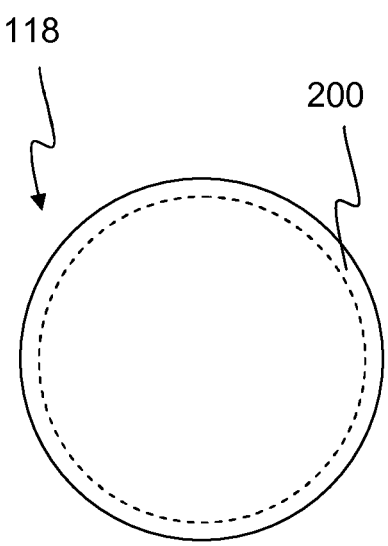

FIGS. 2(a) and 2(b) show the formed heat source 118 having a barrier 200. As can be seen, the barrier is formed into a convex cap having side walls 202. The convex cap is formed by the concave profile of the punch, and the shape of the convex cap substantially matches the shape of the concave profile of the punch. Providing a convex cap may improve the adhesion between the cap and the heat source. Providing a convex cap may, in addition or alternatively, reduce the risk of the particulate material fragmenting at the interface between the cap and the heat source. The compressed particulate material 204 forms the heat source. The heat source is approximately 7.8 mm in diameter and approximately 9 mm in length. As shown in FIG. 2(b) the combustible heat source 118 having a barrier 200 is substantially circular in cross-section.

The heat source is used in a smoking article. The smoking article comprises a heat source formed as described above, an aerosol-forming substrate provided adjacent the barrier of the heat source, a diffuser, a transfer section, a filter adapted to condense vapour, and a mouthpiece filter. The components are wrapped in tipping paper which may comprise an additional aluminium wrap adjacent the heat source and the aerosol-forming substrate. In use, the user initiates combustion of the heat source which heats the aerosol-forming substrate to generate a substrate. As the user draws on the smoking article air is drawn through ventilation holes upstream of the aerosol-forming substrate which entrains the aerosol.

The embodiments and examples described above illustrate but do not limit the invention. Other embodiments of the invention may be made without departing from the spirit and scope thereof, and it is to be understood that the specific embodiments described herein are not limiting.

The invention claimed is:

1. A method of manufacturing a combustible heat source having a barrier, comprising:
providing a mould defining a cavity;
placing a particulate component in the mould cavity;
placing a laminar component, adjacent the mould, to cover the cavity opening; and
compressing the particulate component to form the combustible heat source,
wherein, during the compression step, the barrier is formed by punching the laminar component using a punch and the mould, the punch acting on the barrier to compress the particulate component and affix the barrier to the combustible heat source.

2. The method of manufacture according to claim 1, further comprising providing an adhesive between the combustible heat source and the barrier.

3. The method of manufacture according to claim 2, wherein the adhesive is applied to the laminar component before being placed adjacent the mould.

4. The method of manufacture according to claim 3, wherein the adhesive is applied by at least one of: a spray gun; a roller; and a slot gun.

5. The method of manufacture according to claim 1, wherein the particulate component is provided with a binding agent.

6. The method of manufacture according to claim 5, wherein the binding agent is configured to bind the combustible heat source to the barrier.

7. The method of manufacture according to claim 1, wherein the barrier at least partially extends along a side of the combustible heat source to form a cap.

8. The method of manufacture according to claim 1, wherein the punch profile is concave.

9. The method of manufacture according to claim 1, wherein the barrier is heat conductive.

10. The method of manufacture according to claim 1, wherein a thermal conductivity of the barrier is at least about 200 W/m·K.

11. The method of manufacture according to claim 1, wherein the barrier is non-combustible.

12. The method of manufacture according to claim 1, wherein the barrier is substantially air-impermeable.

13. The method of manufacture according to claim 1, utilising a continuously rotating multi-cavity press.

14. The method of manufacture according to claim 1, wherein the particulate component comprises a combustible carbonaceous material.

15. The method of manufacture according to claim 1 for manufacturing a combustible heat source for a smoking article.

* * * * *